Patented Nov. 3, 1936

2,059,310

UNITED STATES PATENT OFFICE 2,059,310

BRONZING LIQUID

Charles Bogin, Terre Haute, Ind., and Vaughn Kelly, Chicago, Ill., assignors to Commercial Solvents Corporation, Terre Haute, Ind., a corporation of Maryland No Drawing. Application November 5, 1934, Serial No. 751,580

3 Claims. (Cl. 134—79)

Our invention relates to improvements in bronzing lacquers having a nitrocellulose base. More specifically, our invention relates to an improved type of bronzing lacquer not subject to the usual defect of rapid gelling.

A bronzing lacquer consists essentially of a suspension of bronze powder in a nitrocellulose solution or "bronzing liquid". The usual solvent mixtures are employed in these bronzing liquids, and nitrocellulose of the high viscosity or "bronzing cotton" type is usually used although cotton of lower viscosity may also be used. Gums and plasticizers are added in some cases to improve the adhesion of the film to the under surface, and to improve its elasticity. The bronze powder is usually not added to this mixture during its preparation, but is stirred into the finished liquid just before it is desired to use the lacquer. The reason for this procedure is the tendency of all bronzing lacquers to form gels shortly after the admixture of the bronze powder. The life of the lacquer, e. g., the length of time before gelling occurs depends upon the concentration and type of bronze used, the grade of cotton, the strength of the solvent mixture, and other factors. In general, however, gel formation takes place in less than ten days, and usually in from two hours to two days. The entire lacquer will gel if the bronze has remained suspended, but if it has settled, the gel will be formed only at the bottom, in the vicinity of the bronze powder. This gel, although often soluble in additional strong solvents, in a great many cases, cannot be dispersed by further addition of the usual solvent mixtures or by any mechanical means. For this reason, the tendency to form such gels obviously detracts from the usefulness of bronzing lacquers.

Although no adequate explanation has been offered for this phenomenon, a number of preventative agents have been recommended to overcome it. Most of these agents, however, have failed to accomplish their purpose and some, such as sodium carbonate, not only have no beneficial action, but are in reality detrimental and tend to cause gel formation. Others, although capable of preventing gelling, possess other disadvantages which make their use impractical. All of the agents thus far recommended have been either acidic or alkaline in nature and up to the present time no suitable neutral materials have been discovered.

We have now found that the esters and salts of citric acid are powerful inhibiting agents, possessing none of the disadvantages of the previously recommended materials. For example potassium citrate ($K_3C_6H_5O_7.H_2O$) will prevent gelling in certain cases if employed in as small amounts as 0.1% of the total weight of the bronzing liquid. In general, an addition of a citric acid salt or ester in a concentration equivalent to 0.5% to 2.0% of potassium citrate will prevent gelling for considerable lengths of time. For example, an inhibitor concentration corresponding to 0.7% by weight of potassium citrate will be found to prevent the gelling of most types of bronzing lacquers for a period of at least 15 days and in most cases for 60 days or longer. Lacquers containing no inhibitor, on the other hand, will be found to gel in 2 days in most instances and almost invariably in 10 days.

The bronzing lacquers in which citric acid salts or esters can be satisfactorily used as anti-gel agents may be of any of the usual types. The nitrocellulose may be the ½ second or 4 second type, or a high viscosity cotton such as 40 or 70 second bronzing cotton. The usual plasticizers, such as dibutyl phthalate, castor oil, or lindol (tricresyl phosphate) may be used. Gums such as dammar, ester gum, elemi, or synthetic resins may be incorporated in the lacquers. The bronze powder may be the various copper-zinc alloys, mixtures of such powders, or such powders with pigments or dyes incorporated in them. These powders are usually mixed with a little thinner and then added to the finished bronzing liquid. The bronze is added in proportions which may vary over a wide range, depending upon the particular type of lacquer desired. For 100 parts of nitrocellulose, 10 to 1000 parts or more of bronze powder may be used. However, 100 to 200 parts are satisfactory for most purposes. The solvent mixtures usually used contain esters, alcohols, hydrocarbons, and, if desired, carbonyl compounds or ethers. Esters such as ethyl acetate, butyl acetate or butyl propionate; carbonyl compounds such as furfural, acetone, or diacetone alcohol, and ethers such as the monoethyl ether of ethylene glycol or the monobutyl ether of ethylene glycol are used as nitrocellulose solvents. The alcohols such as ethanol, butanol, or cyclohexanol, are used to dissolve the gums, or as activated solvents. The hydrocarbons such as benzol, toluol, or naphtha, are used to dissolve gums or to serve as cheap diluents. It is always desirable also that a certain amount of high-boiling solvents such as butyl acetate, butyl propionate, or amyl acetate be present to promote good flow and prevent "blushing".

The gel preventative is incorporated in the bronzing fluid generally in proportions of from approximately 2% to approximately 25% the weight of the cotton. In most instances we prefer to use the preventative in a proportion of substantially 5–15% the weight of the cotton. Of course, in special cases the limits may be much greater; under certain conditions the preventative may be employed in proportions of 0.1% to 100% or more of the cotton. For example, if a large amount of bronze powder is used, more preventative is needed than if only a small amount of the powder were present. This is also generally the case when certain grades of bronze such as oxidized bronze, or when cottons of doubtful or low stability are used. The amount of preventative necessary to prevent gelling depends also to some extent on the proportions of resins in the bronzing liquid and to some extent upon the solvent composition since very rich solvent mixtures do not gel as badly as lean mixtures.

*Examples*

The following are type formulae for bronzing lacquers in which citric acid salts and esters are incorporated to prevent gelling:

I

| | Parts |
|---|---|
| Bronzing cotton | 7 |
| Ester gum | 3 |
| Castor oil | 2 |
| Bronze powder | 15 |
| Sodium citrate | 0.2 to 2.5 | in 100 parts of a solvent mixture consisting of:

| | Percent |
|---|---|
| Butyl acetate | 15 |
| Butanol | 10 |
| Ethyl acetate | 10 |
| Ethyl alcohol | 10 |
| Toluol | 55 |

II

| | Parts |
|---|---|
| Nitrocellulose (½ sec.) | 10 |
| Ester gum | 5 |
| Dibutyl phthalate | 3 |
| Bronze powder | 15 |
| Ethyl citrate | 0.2 to 2.5 | in 100 parts of a solvent mixture consisting of:

| | Percent |
|---|---|
| Butyl acetate | 25 |
| Butanol | 15 |
| Ethyl acetate | 15 |
| V. M. P. naphtha | 45 |

III (*Flexible*)

| | Parts |
|---|---|
| Bronzing cotton | 6 |
| Elemi | 5 |
| Castor oil | 4 |
| Bronze powder | 10 |
| Potassium citrate | 0.2 to 2.5 | in 100 parts of a solvent mixture consisting of:

| | Percent |
|---|---|
| Butyl acetate | 20 |
| Butanol | 10 |
| Ethyl acetate | 10 |
| Xylol | 15 |
| Toluol | 45 |

While we do not know the exact mechanism whereby the citric acid salts and esters prevent the gelling of bronzing liquids it appears that their beneficial effect may be due to their precipitation of the small amounts of metal or oxide from the bronze which go into solution, thus converting this material into a form which does not readily enter into chemical reaction with the nitrocellulose. Indications are that due to the action of either the metal or the oxide present on its surface the nitrogen content of the nitrocellulose is lowered, giving a product which is insoluble in all but the most powerful solvents and solvent mixtures. Precipitation therefore results and takes the form of gelling, this portion of the nitrocellulose forming the closed phase. All of the nitrocellulose is not necessarily affected since the gelling might be caused by the precipitation of only a minute amount of solid material and the consequent setting up of a structure enclosing the portion of the solution not affected. It is believed that the beneficial effect of the preventative is due to the precipitation of the small amounts of metal or oxide which go into solution, their removal from the system thus preventing any chemical action between them and the nitrocellulose. This theory is substantiated at least in part by the fact that the inhibiting effect is not dependent upon either alkalinity or acidity, as such.

It is to be understood that while our invention is substantially described by the above disclosure and examples, it is not to be construed as limited to the use of the substances or combinations specifically named. Citric acid salts and esters other than those in the above examples may, of course, be employed. For example, among the suitable esters there may be mentioned the propyl, butyl, and amyl esters. In general, however, we prefer to utilize the aliphatic esters and the alkali metal salts.

The present application is a continuation-in-part of our application Ser. No. 421,871, filed January 18, 1930.

Now, having described our invention, what we claim is:

1. A nitrocellulose bronzing lacquer containing as gel preventative an alkali metal salt of citric acid in an amount sufficient to prevent gelling of the composition and insufficient to affect deleteriously the composition as a whole.

2. A nitrocellulose bronzing lacquer containing as gel preventative sodium citrate in an amount sufficient to prevent gelling of the composition and insufficient to affect deleteriously the composition as a whole.

3. A nitrocellulose bronzing lacquer containing as gel preventative potassium citrate in an amount sufficient to prevent gelling of the composition and insufficient to affect deleteriously the composition as a whole.

CHARLES BOGIN.
VAUGHN KELLY.